United States Patent [19]
Klyn

[11] Patent Number: 4,464,149
[45] Date of Patent: Aug. 7, 1984

[54] UNIVERSAL LAGGING

[76] Inventor: Edward D. Klyn, 1007 Liberty, Pella, Iowa 50219

[21] Appl. No.: 353,147

[22] Filed: Mar. 1, 1982

Related U.S. Application Data

[63] Continuation of Ser. No. 147,083, May 7, 1980, abandoned.

[51] Int. Cl.³ .............................................. F16H 55/36
[52] U.S. Cl. ...................................... 474/185; 29/124
[58] Field of Search ............................... 474/184–186; 29/124; 198/835, 842

[56] References Cited

U.S. PATENT DOCUMENTS

| | | | |
|---|---|---|---|
| 332,998 | 12/1885 | Coupland | 29/124 |
| 1,025,108 | 4/1912 | Biggar | 474/186 |
| 1,211,937 | 1/1917 | Gutmann | 474/184 |
| 1,691,993 | 11/1928 | Rogers | 474/185 |
| 2,707,403 | 5/1955 | Thomson et al. | 474/184 |
| 3,046,805 | 7/1962 | Van Gorp | 474/185 |
| 3,064,330 | 11/1962 | Skidmore | 29/124 |
| 3,220,272 | 11/1965 | Beausoleil | 474/186 |
| 3,354,735 | 11/1967 | Holz | 474/185 |
| 3,363,476 | 1/1968 | Brown | 474/185 |
| 3,392,594 | 7/1968 | Van Gorp | 474/185 |
| 3,789,682 | 2/1974 | Holz | 474/185 |
| 4,233,853 | 11/1980 | Holz | 474/185 |

Primary Examiner—Lawrence J. Staab
Attorney, Agent, or Firm—Henderson & Sturm

[57] ABSTRACT

This invention relates to replaceable rubber laggings for either drum or wing pulleys in general, and more specifically to a universal lagging structure which due to its design and dimensions can be manufactured in one size, has a mounting support structure which allows it to be easily installed on either type pulley, and when installed on a drum pulley the individual laggings are spaced a distance of $\pi/2$ units of length around the circumference of the drum and the number of laggings employed on a given size drum equals the number of units of length in the diameter of the drum, with each lagging being $\pi/2$ units in width.

3 Claims, 2 Drawing Figures

UNIVERSAL LAGGING

CROSS-REFERENCE TO RELATED APPLICATION

This is a continuation of application Ser. No. 147,083, filed May 7, 1980 now abandoned.

BACKGROUND OF THE INVENTION

Drum pulleys and wing pulleys used to drive conveyor belts or similar devices are normally provided with high friction surfaces for increased traction between the pulley and belt. The high friction surfaces are usually strips, or pads of rubber, in the form of laggings. In the past rubber laggings were either permanently affixed or rigidly secured to the pulley perimeter; however, this proved to be impractical due to the frictional wear and deterioration of the rubber over an extended period of time. The difficulty of removing the friction surfaces from the pulleys when the material was worn down led to the development of replaceable lagging structures. Examples of such replaceable laggings may be had by reference to U.S. Pat. Nos. 3,363,476; 3,354,735; 3,392,594; 3,046,805 and 3,220,272.

While all of the prior art devices enumerated above perform reasonably well on the specific type of pulley for which they are designed, they are not interchangeable between the drum and wing pulleys. Another problem encountered is that there is no uniformity with respect to lagging sizes and dimensions among specific and individual types of pulleys. A quick review of the patents listed supra, would confirm that none of the lagging structures employed for the wing pulleys, could be readily substituted for one another. This problem is not restricted to the wing pulleys, as the same situation applies to the drum pulleys as well.

As a consequence of this lack of uniformity, suppliers of laggings are required to keep an enormous inventory, on hand, and in stock, of a variety of sizes, configurations and types of replaceable laggings to satisfy their customers tailored needs.

A universal lagging structure which solves this problem is embodied in the invention which forms the basis for this application.

SUMMARY OF THE INVENTION

An object of the instant invention is the provision of a pulley lagging structure which is equally adaptable to a drum or wing pulley.

A further object of the instant invention is the provision of a universal lagging structure having a specified width which is suitable for installation on any diameter drum.

Yet another object of the instant invention is the provision of a lagging structure which by virtue of its dimensions can be uniformly spaced about the circumference of any diameter drum pulley.

Still another object of the instant invention is the provision of a lagging structure for a drum pulley wherein the number of laggings disposed on the circumference of the drum equals the number of inches in the diameter of the drum.

A still further object of the present invention is the provision of a universal lagging structure having a unique mounting arrangement; wherein, a portion of the lagging can be readily secured to the surface of either a wing or drum pulley, while allowing easy replacement of the high friction lagging surface.

Another object of the present invention is the provision of a universal lagging structure which will overcome all of the deficiencies inherent in the prior art structures, and solve all of the problems occasioned thereby.

These and other objects, advantages and novel features of the present invention will become apparent from the following detailed description of the invention when considered in conjunction with the accompanying drawings.

DESCRIPTION OF THE PREFERRED EMBODIMENT

Figure 1:
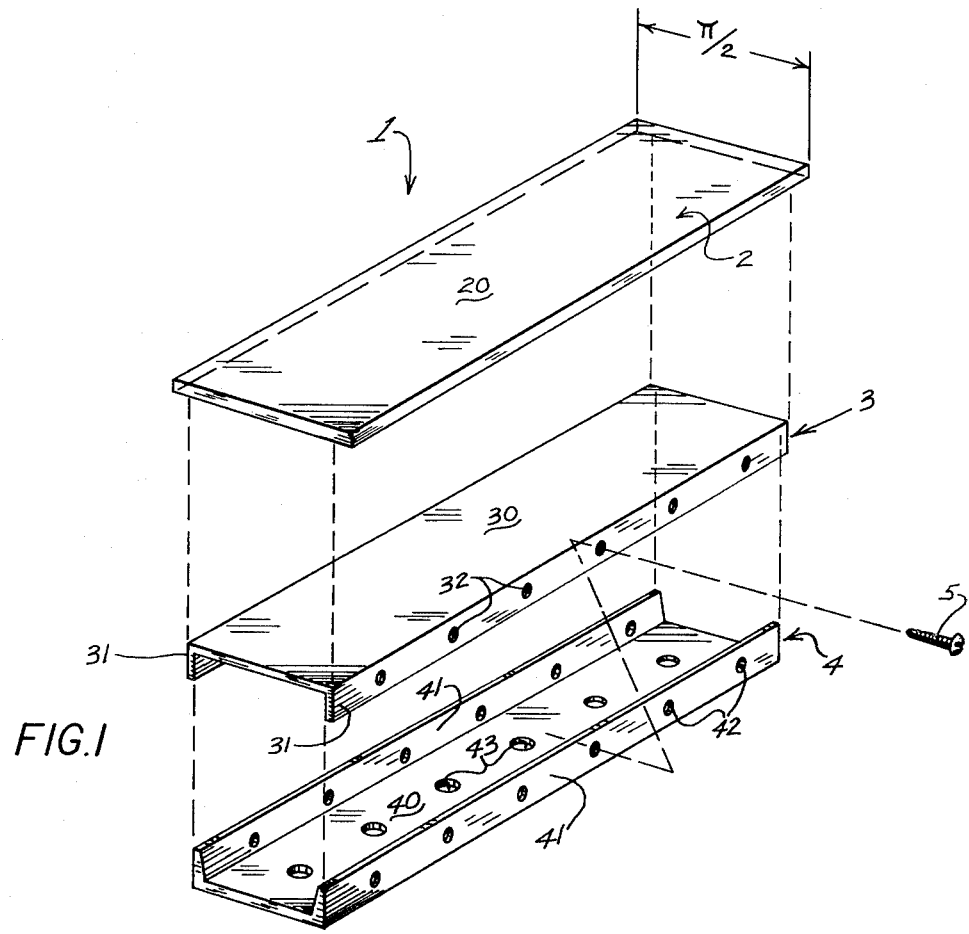
FIG. 1 is an exploded perspective view of the universal lagging which forms the basis of this invention.

As can be seen by reference to FIG. 1, the universal lagging of the instant invention, is designated generally as 1, and comprises an elongated resilient traction pad or lagging 2, which is secured to a rigid, generally U-shaped backing plate 3, which is adapted to fit over, and be removably attached to, a generally U-shaped mounting bracket 4, via a plurality of fastening means 5.

The lagging 2, comprises a thick, elongated, rectangular sheet 20 of high coefficient of friction material, such as rubber or the like, which is secured by adhesives, or by vulcanizing the material to the top surface 30 of the backing plate 3. The sides 31 of the backing plate 3 are provided with a plurality of apertures 32, which are aligned with corresponding apertures 42 in the sides 41 of the mounting bracket 4. The apertures 32 and 42 are dimensioned to receive fastening means 5, to removably secure the backing plate 3 to the mounting bracket 4.

The base 40 of the mounting bracket 4 is further provided with a plurality of mounting apertures 43. The mounting apertures 43 are spaced from one another, and centrally disposed along the length of the mounting bracket base 40, to facilitate the securing of the mounting bracket 4 to a drum or wing pulley (illustrated in phantom, and designated D and W respectively).

To attach the mounting bracket 4 to a drum pulley, the mounting apertures 45 are positioned in intimate contact with the pulley surface, and the bracket would be welded to the drum through the mounting apertures 43 from above. The mounting apertures would form reservoirs for the weldment and would simply be filled with weldment to accomplish the installation of the bracket on the pulley.

Once the mounting bracket 4 is secured in the desired position on the drum, the backing plate 3, which forms an outer channel member, is slipped over the sides 41 of mounting bracket, and secured thereto via fastening means 5.

The width of the traction pad or lagging 2 is an extremely important aspect of this invention especially with respect to the drum pulleys. The circumference of a circle, or drum, is equal to $\pi$ multiplied by the diameter of the circle. The applicant has, therefore, determined that by providing laggings having a width of $\pi/2$ inches (assuming that the unit of measurement used is inches), and by spacing each lagging a distance of $\pi/2$ inches from the adjacent lagging, the number of laggings required for any given drum is equal to the diameter of the drum in inches. For example, a drum having a 24″ diameter would require 24 laggings uniformly spaced $\pi/2$ inches apart. By having all of the laggings $\pi/2$ in width or approximately 1.507 inches, the distributor need only stock the one size for any size drum pulley. In the industry, it is common for each size drum to require a different width lagging. Consequently, the advantages of having to stock only one size lagging are obvious.

A further benefit of using this specific dimension, is that once the first lagging has been installed on the circumference of a drum pulley, the succeeding laggings may be properly spaced by interposing a lagging, adjacent to, parallel, and between the installed lagging and the next one to be installed, to determine the proper position and spacing of the succeeding laggings.

Figure 2:
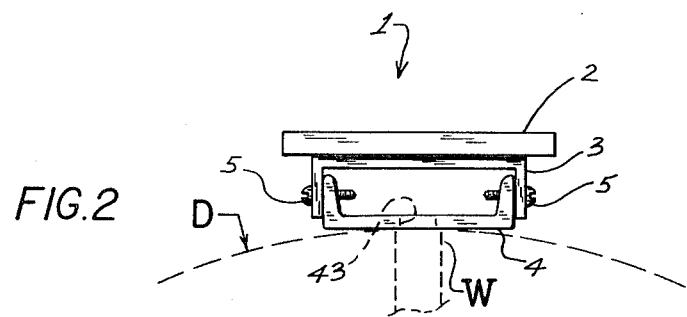
FIG. 2 is an end plan view of the universal lagging of the instant invention showing the device connected to either a drum or a wing pulley.

To install the lagging on a wing pulley, the assembled lagging 1, is centered on top of a wing W and then spot welded from below, securing the mounting bracket 4 to the outermost edge of the wing W as shown in FIG. 2. The backing plate 3, with traction pad 2 vulcanized thereto, can then be secured to the bracket 4 by means of fastening means 5.

It should also be noted, that having the friction pad 2 mounted flush with the backing plate 3 allows complete wear of the friction material 20 before the lagging must be replaced. The replacement of an individual lagging is accomplished by removing the fastening means 5, lifting or sliding the backing plate 3 off the mounting bracket 4, sliding a new backing plate and friction pad on the mounting bracket to align the apertures 32 and 42, and reinserting the fastening means 5.

Having thereby disclosed the subject matter of this invention it should be obvious that many modifications, substitutions and variations of the invention are possible in light of the above teachings. It is therefore to be understood, that the invention may be practiced other than as specifically described, and should be limited only by the breadth and scope of the appended claims.

What I claim is:

1. A replaceable lagging device, comprising:
    a mounting bracket adapted for securement to either the periphery of the drum pulley or the terminal end of the wing of a wing pulley, both types of pulleys being generally cylindrical in shape about an elongated axis of rotation, said mounting bracket being an elongated U-shaped channel having a base with a relatively flat undersurface adapted to face the pulley, and having further a pair of upturned, parallel side members extending along the outer side edges of said base, said side members extending parallel to the axis of rotation of the pulley and adapted to extend outwardly and away from the pulley;
    means for securing said mounting bracket to said pulley;
    a backing plate releaseably secureable to said mounting bracket, said backing plate including a pair of backing side members disposed to extend inwardly toward said pulley and disposed to overlap said mounting side members, said backing plate further including a top surface disposed outwardly from said mounting bracket and outwardly from said backing side members;
    means for releaseably securing said backing plate to said mounting bracket; and
    a friction pad attached to said top surface of said backing plate and disposed outwardly therefrom, whereby complete wear of the thickness of the friction pad is allowed before the lagging must be replaced, and wherein said base has a width slightly less than the width of said pad.

2. The replaceable lagging device of claim 1, wherein said base is secured to said pulley by weldment.

3. The replaceable lagging device of claim 1, wherein said backing plate is a U-shaped channel including a top surface and two backing side members extending inwardly normal to said top surface and parallel to the axis of rotation of the pulley.

* * * * *